United States Patent [19]

Lim

[11] Patent Number: 5,506,689
[45] Date of Patent: Apr. 9, 1996

[54] TIME CODE FORMAT CIRCUIT

[75] Inventor: Hoa-sub Lim, Suwon, Rep. of Korea

[73] Assignee: Samsung Electronics Co., Ltd., Kyungki-Do, Rep. of Korea

[21] Appl. No.: 271,658

[22] Filed: Jul. 7, 1994

[30] Foreign Application Priority Data

Jul. 7, 1993 [KR] Rep. of Korea .................. 93-12439

[51] Int. Cl.$^6$ .................. H04N 9/79; G11B 9/09
[52] U.S. Cl. .................. 358/311; 360/49
[58] Field of Search .................. 360/14.2, 14.3, 360/48, 49, 13, 72.2; 358/310, 335, 342, 311

[56] References Cited

U.S. PATENT DOCUMENTS

| | | | |
|---|---|---|---|
| 5,386,402 | 1/1995 | Iwata | 369/32 |
| 5,414,570 | 5/1995 | Fry et al. | 360/48 |
| 5,418,657 | 5/1995 | Machado et al. | 360/40 |
| 5,442,498 | 8/1995 | Cheung et al. | 360/77.08 |
| 5,446,604 | 8/1995 | Chiba | 360/49 |

Primary Examiner—Tommy P. Chin
Assistant Examiner—Robert Chevarlier
Attorney, Agent, or Firm—Sughrue, Mion, Zinn, Macpeak & Seas

[57] ABSTRACT

A time code format circuit in which information regarding a system state and a tape is formatted on a user's bit area within a time code used for playback/editing in a VCR, thereby easily confirming the operational state of the system and the tape information as well as effectively utilizing the user's bit area.

5 Claims, 4 Drawing Sheets

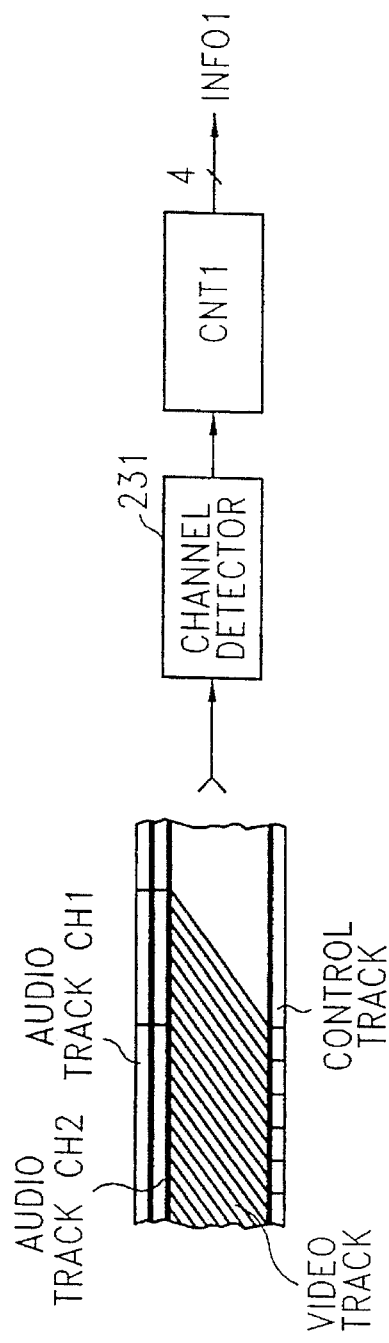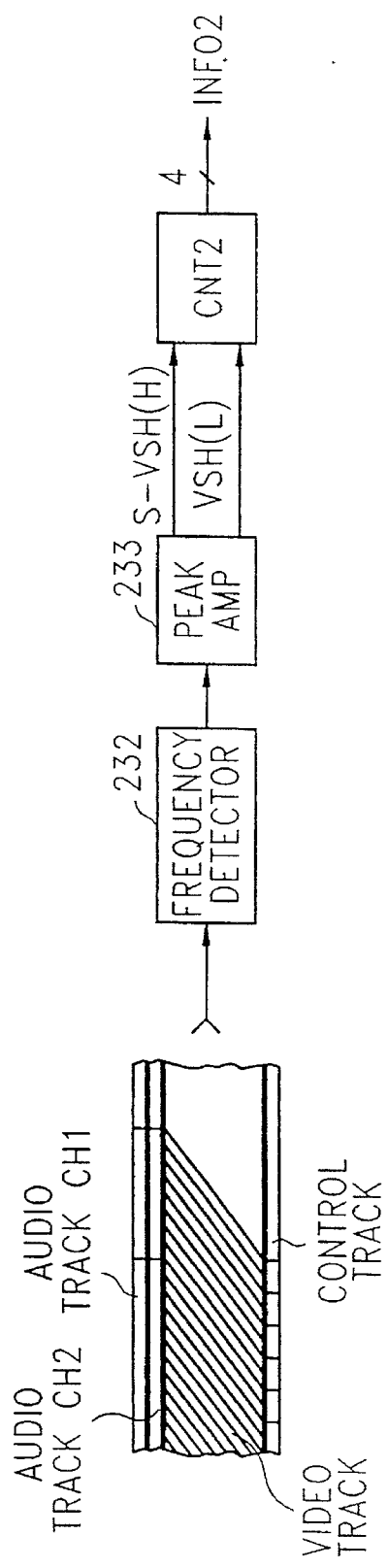

TIME CODE FORMAT CIRCUIT

BACKGROUND OF THE INVENTION

The present invention relates to a time code format circuit, and more particularly, to, a time code format circuit which records information regarding system states and a tape, on a user's bit area within a time code which is used in tape editing so as to effectively use the user's bit.

Generally, when editing a tape, it is played back by a reproducer and its playback signal is selected and recorded on the editor's tape such that a time code format is divided into time code data for use in displaying tape traveling position or travelling time; and user's bit data having 4×8(32) bits in which only information regarding a tape number and reel number can be recorded. FIG. 1 is a block diagram of an editing VCR system using a conventional time code format.

As shown in the drawing, a video/audio signal photographed via a video camera or a signal reproduced by a reproducer is applied respectively to a signal processor 100 and a time code format circuit 200 via an input port. Signal processor 100 outputs the input signal $S_{IN}$ as a signal recordable on a recording tape or tape for editing. Time code format circuit 200, obtaining corresponding information from the input signal $S_{IN}$ according to a predetermined format, formats and outputs 32-bit time code data, 32-bit user's bit data, and sync words. An adder ADD adds the output signal of the time code format circuit to a region of the signal applied from signal processor 100, thereby outputting a signal $S_{out}$ recordable on tape. Here, information regarding the usage of a tape number and reel number is the only information recorded in the 32 user's bits UB. Therefore, when the above-mentioned information is unnecessary, the user's bits UB are essentially unused.

SUMMARY OF THE INVENTION

It is an object of the present invention to provide a time code format circuit which formats information regarding system states and the tape that a user must be aware of during editing and transmission in a broadcast station, video production or public offices, within user's bit data so that the user can easily confirm such information and effectively use the user's bit data.

To accomplish this object, in a circuit for formatting a time code including a time code data region in which time code data is recorded during tape playback/editing, a user's bit region, and a sync word region in which sync word data is recorded, a time code format circuit comprises:

means for generating information regarding a tape number and reel number as first user's bit data to be recorded on a predetermined position of the user's bit region; means for generating information regarding the operation of a reproducer/editor and the state of the tape as second user's bit data to be recorded on the user's bit region where the first user's bit data is not recorded; a seriating means for outputting the time code data, the first user's bit data, the second user's bit data, and the sync word date in serial form; and, an arranging means for arranging the data applied from the seriating means in a predetermined format.

BRIEF DESCRIPTION OF THE ATTACHED DRAWINGS

FIG. 3A is a block diagram of a circuit for generating channel detection information;

FIG. 3B is a block diagram of a circuit for generating tape information;

DETAILED DESCRIPTION OF THE INVENTION

Hereinafter, a preferred embodiment of the present invention will be described with reference to the attached drawings.

Figure 1:
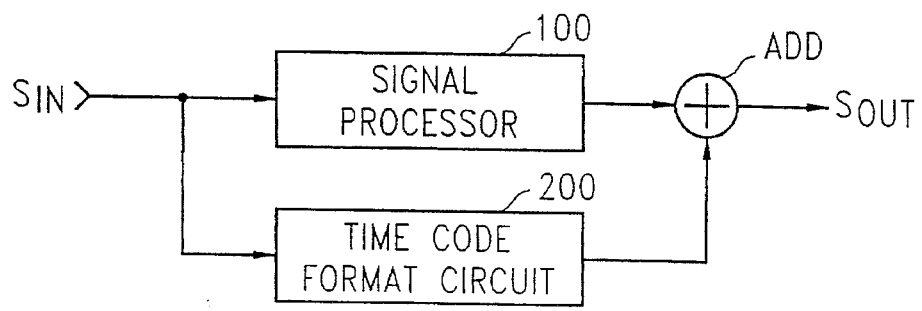
FIG. 1 is a block diagram of an editing VCR system using a conventional time code format circuit.
Figure 2:
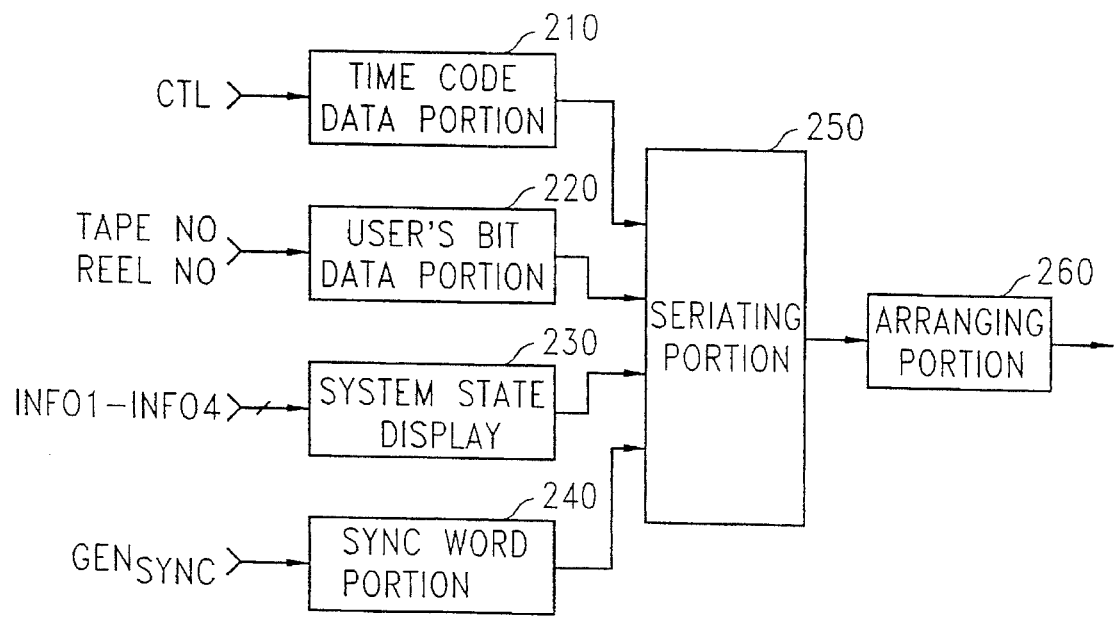
FIG. 2 is a block diagram of a time code format circuit of the present invention.

Referring to FIG. 2, a time code format circuit comprises a time code data portion 210 for counting, in units of frames, a control signal CTL applied from the control track during tape playback, and thereby obtaining time code data. Time code data portion 210 for a reproducer or editor has an electronic tape counter. Tape travelling time, indicated with the time code data obtained from time code data portion 210, can be digitally displayed to ±9 hours 59 minutes 59 seconds 29 frames (one second =one frame). The time code format circuit of the present invention also comprises a user's bit data portion 220, for receiving information regarding a tape number and a reel number selected by a user, and producing the user's bit data. The user's bit data is recorded on the first half (16 bits) of the 32 user's bits UB. The time code format circuit further comprises a system state display 230 for receiving system state information INFO1-INFO4, thereby obtaining another user's bit data, and a sync word portion 240 for receiving a sync generating signal $GEN_{sync}$, thereby generating sync word data.

System state display 230 receives system state information INFO1–INFO4 from circuits illustrated in FIG. 3 and produces user's bit data recordable on the remaining 16 user's bits. Sync word portion 240 generates the sync bit of the time code in response to $GEN_{sync}$. A seriating portion 250 for outputting the input data in serial form is connected to the output ports of the circuits 210, 220, 230, and 240. An arranging portion 260 for arranging the input data in a predetermined arrangement format is coupled to the seriating portion 250.

Figure 3C:
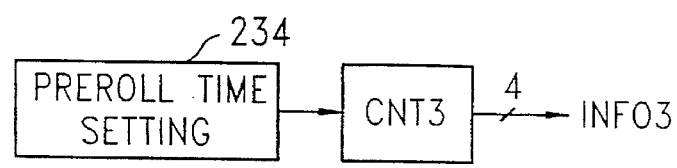
FIG. 3C is a block diagram of a circuit for generating preroll time information.
Figure 3D:
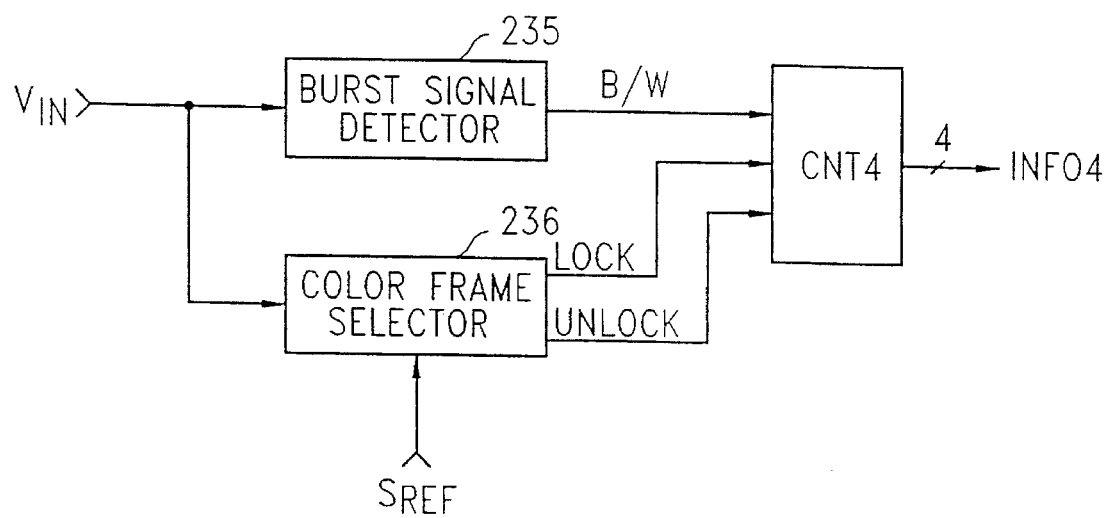
FIG. 3D is a block diagram of a circuit for generating color frame information.

FIG. 3 is a block diagram of a circuit for generating information to be input to the system state display 230 of FIG. 2. FIG. 3A illustrates a circuit for displaying channel selection information INFO1 during playback/recording of an audio signal. FIG. 3B illustrates a circuit for displaying information INFO2 regarding whether the system is VHS format or S-VHS format, FIG. 3C illustrates a circuit for displaying predetermined preroll time information INFO3. FIG. 3D, illustrates a circuit for displaying color frame information during playback/recording of a video signal.

In FIG. 3A, a channel detector 231 detects a recorded channel from the audio track via an audio head during tape playback. A first counter CNT1 outputs corresponding 4-bit binary data INFO1 to system state display 230 in response to the channel detected from channel detector 231. In other words, the output binary information according to the detected channel can be as shown in table 1.

TABLE 1

| BINARY INFORMATION | DETECTED CHANNEL |
|---|---|
| 0001 | CH1 |
| 0010 | CH2 |
| 0011 | MIX |
| 0100 | Hi-Fi |

In FIG. 3B, a frequency detector 232 detects the frequency recorded on the tape by using the fact that the frequency bands employed in the VHS format are different from those employed in the S-VHS format. Only the peak of the detected frequency is amplified to a predetermined magnitude in peak amplifier 233 and compared with a predetermined magnitude so as to generate a binary signal. A second counter CNT2 outputs corresponding 4-bit binary information INFO2 to system state display 230 in response to the binary signal from peak amplifier 233. If a HIGH signal is output from peak amplifier 233, second counter CNT2 outputs binary information "0010" indicative of the tape being a S-VHS format tape. If otherwise a LOW signal is applied, binary information "0001" indicative of the tape being a VHS format tape is output.

In FIG. 3C, preroll time setter 234 previously sets preroll time. Preroll is a delay time of about 5 seconds in which no recording current immediately flows during a playback/recording operation, so as to precisely coincide with the editing start point of the editor in a VCR. A third counter CNT3 outputs corresponding 4-bit binary information INFO3 to system state display 230 in response to the predetermined preroll time applied from preroll time setter 234. An example of the output binary information regarding the predetermined preroll time is shown in table 2.

TABLE 2

| BINARY INFORMATION | SET PREROLL TIME (sec) |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

In FIG. 3D, a burst signal detector 235 detects a burst signal from an input video signal $V_{IN}$. A color frame selector 236 compares the input video signal $V_{IN}$ and a reference signal $S_{REF}$ so as to generate a binary signal. A fourth counter CNT4 outputs corresponding 4-bit binary information INFO4 in response to the burst signal B/W applied from burst signal detector 235 and the binary signal applied from color frame selector 236. If a HIGH signal is applied from color frame selector 236, fourth counter CNT4 outputs binary information "0010" indicative of a state when a current frame unit of input video signal is selected. Conversely, if a LOW signal is applied, binary information "0001" indicative an a unlock state is output.

Figure 4A:
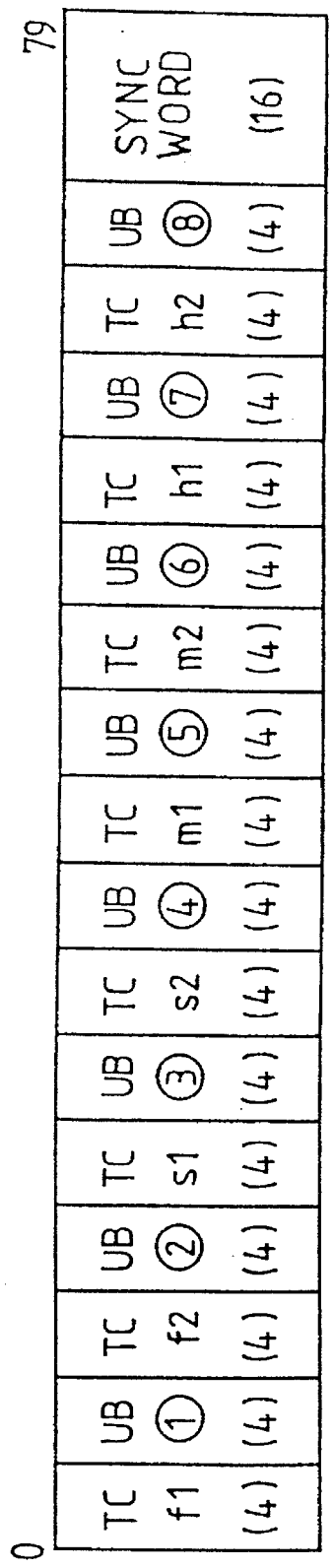
FIG. 4A is a conceptual diagram showing an 80-bit longitudinal time code (LTC) format output from the arranging portion.
Figure 4B:
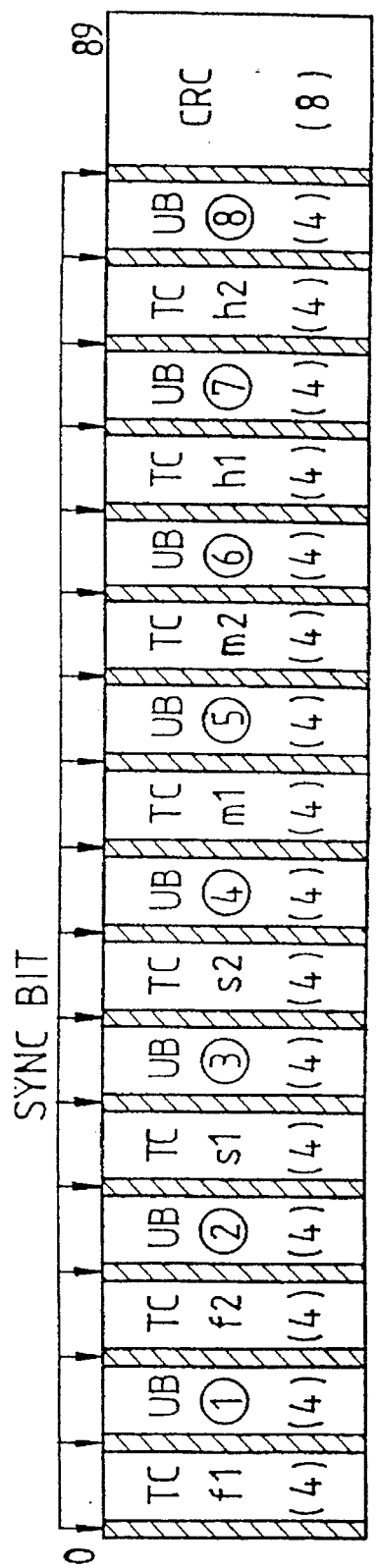
FIG. 4B is a conceptual diagram showing a 90-bit vertical interval time code (VITC) format output from the arranging portion.

FIG. 4A shows an arrangement format of 80-bit longitudinal time code (LTC), which is recorded on the audio track or horizontal sync signal of the tape. Here, on the first half (1–4) of the user's bits UB, conventional information regarding the tape number and reel number is recorded. On the last half (5–8) thereof, system state information is recorded. FIG. 4B illustrates an arrangement format of a 90-bit vertical interval time code (VITC), which is recorded together with a video signal especially in the vertical blanking period. Here, the sync bit, time code data, and user's bit data are repeatedly arranged, and there is a CRC (cyclic redundancy code) area, for example, an 8-bit error correction code.

Arranging portion 260 arranges input bits in the above-explained formats, and formats one time code which is then output to be recorded on the corresponding video and audio signal areas. Meanwhile, a time code in which state information regarding the system and tape is formatted in the user's bit (UB) data, as well as the tape number and reel number, can be displayed via a liquid crystal display means of the reproducer or editor.

As described above, during playback/editing, the time code format circuit of the present invention can additionally format system or tape state information in the user's bit area within the time code, and the user can easily confirm information regarding the system operation and the tape, and it thus, enhances the utility of the user's bit area.

What is claimed is:

1. A circuit for formatting a time code, wherein the time code format includes a time code data region in which time code data is recorded during tape playback/editing of a tape in a tape reproducer/editor, a user's bit region, and a sync word region in which sync word data is recorded, a time code format circuit comprising:

means for generating information regarding a tape number and a reel number as first user's bit data to be recorded on a predetermined position of said user's bit region;

means for generating information regarding the operation of the reproducer/editor and the state of the tape as second user's bit data to be recorded on said user's bit region where said first user's bit data is not recorded;

a seriating means for outputting said time code data, said first user's bit data, said second user's bit data, and said sync word data in serial form; and an arranging means for arranging said data output from said seriating means in a predetermined format.

2. A time code format circuit as claimed in claim 1, wherein said second user's bit data generating means comprises:

a channel detector for detecting a channel recorded on an audio track of the tape; and a first counter for generating a predetermined number of bits of binary information corresponding to said channel detected by said channel detector.

3. A time code format circuit as claimed in claim 1, wherein said second user's bit data generating means comprises:

a frequency detector for detecting the frequency of a signal recorded on a video track of the tape;

a peak amplifier for amplifying the peak of the frequency detected by said frequency detector to a predetermined magnitude and comparing said amplified peak with a predetermined value so as to determine a recording format and outputting a corresponding binary signal; and a second counter for generating a predetermined number of bits of binary information corresponding to said binary signal applied from said peak amplifier.

4. A time code format circuit as claimed in claim 1, wherein said second user's bit data generating means comprises:

a third counter for generating a predetermined number of bits of binary information corresponding to a predetermined preroll time.

5. A time code format circuit as claimed in claim 1, wherein said second user's bit data generating means comprises:

a burst detector for detecting a burst signal from a video signal;

a color frame selector for comparing said video signal and a reference signal and generating a binary signal indicative of whether or not a current frame unit input video signal is selected; and a fourth counter for receiving said detected burst signal, and generating a predetermined number of bits of binary information corresponding to said binary signal applied from said color frame selector.

\* \* \* \* \*